(12) United States Patent
Lehman

(10) Patent No.: US 6,625,977 B2
(45) Date of Patent: Sep. 30, 2003

(54) METHOD AND A SYSTEM FOR REMOVING PARTICULATES AND TOXIC SUBSTANCES FROM AN EXHAUST OF AN ENGINE THAT USE HYDROCARBONS AS A FUEL

(75) Inventor: David L. Lehman, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/742,554

(22) Filed: Dec. 20, 2000

(65) Prior Publication Data

US 2002/0073695 A1 Jun. 20, 2002

(51) Int. Cl.$^7$ .................................................. F01N 3/02
(52) U.S. Cl. .............................. 60/311; 60/274; 60/310; 62/617; 62/632; 95/230
(58) Field of Search .................... 60/272, 274, 282, 60/295, 310, 311, 307, 317, 39.33; 68/18 R; 134/10; 264/3.1; 95/230, 232, 237; 96/372; 422/168–171, 173; 423/210, 212, 215.5, 235, 243.02, 243.12, 245.1, 246; 528/487; 62/617, 632, 637; 588/256

(56) References Cited

U.S. PATENT DOCUMENTS

| | | | |
|---|---|---|---|
| 3,683,626 A | | 8/1972 | Merrill |
| 3,728,433 A | * | 4/1973 | Urban .................... 423/243.02 |
| 3,844,262 A | | 10/1974 | Dieges |
| 3,859,416 A | * | 1/1975 | Urban .................... 423/243.12 |
| 3,905,784 A | | 9/1975 | Kelleher et al. |
| 3,968,649 A | | 7/1976 | Edwards |
| 4,126,000 A | | 11/1978 | Funk |
| 4,265,088 A | | 5/1981 | Funk |
| 4,392,871 A | | 7/1983 | Almlof et al. |
| 4,454,100 A | | 6/1984 | Faatz |
| 4,547,292 A | | 10/1985 | Zarchy |
| 4,609,388 A | * | 9/1986 | Adler et al. .................. 62/632 |
| 4,662,899 A | | 5/1987 | Tandon |
| 4,832,122 A | | 5/1989 | Corey et al. |
| 4,908,047 A | * | 3/1990 | Leonard ...................... 60/310 |
| 4,909,868 A | | 3/1990 | Melvin |
| 5,085,840 A | | 2/1992 | Held et al. |
| 5,256,614 A | | 10/1993 | Itoh et al. |
| 5,289,758 A | | 3/1994 | Berlinger |
| 5,306,684 A | | 4/1994 | Itoh et al. |
| 5,346,674 A | * | 9/1994 | Weinwurm et al. ......... 422/168 |

(List continued on next page.)

OTHER PUBLICATIONS

Mitchell et al., Demilitzrization of High Burn Rate Propellants Containing Ferrocene or its Derivatives, U.S. Statutory Invention Registration H305, Jun. 1987.*

Primary Examiner—Thomas Denion
Assistant Examiner—Tu M. Nguyen
(74) Attorney, Agent, or Firm—Steven Weinrieb; Jason J Stanley

(57) ABSTRACT

A method and a system for treating an internal combustion engine exhaust gas using a hydrocarbons as fuel. The internal combustion engine exhaust gas contains particulates and toxic substances. Such particulates and toxic substances being liquid and gaseous hydrocarbons, carbon monoxide, and $No_x$. The system uses carbon dioxide to interact with the exhaust gas. The carbon dioxide is stored within a container at its triple state. The carbon dioxide and the exhaust gas are conducted through an emission exchanger. The exhaust gas is scrubbed or cleaned by the carbon dioxide and the hydrocarbons, carbon monoxide, $No_x$, and particulate emissions are carried away by a carbon dioxide gas stream. The cleaned exhaust gas can be discharged into the atmosphere. The carbon dioxide gas stream can be cleaned by passing the same through separator components which remove the pollutants therefrom. The cleaned carbon dioxide gas is processed further to restore the carbon dioxide to its triple state for reuse within another operative cycle of the method or system.

16 Claims, 2 Drawing Sheets

U.S. PATENT DOCUMENTS

| | | |
|---|---|---|
| 5,356,538 A | 10/1994 | Wai et al. |
| 5,441,402 A | 8/1995 | Reuther et al. |
| 5,534,475 A | 7/1996 | Miramontes Cardenas |
| 5,540,047 A | 7/1996 | Dahlheim et al. |
| 5,552,128 A | 9/1996 | Chang et al. |
| 5,555,718 A | 9/1996 | Anderson et al. |
| 5,590,519 A * | 1/1997 | Almlöf et al. ............. 60/39.33 |
| 5,606,724 A | 2/1997 | Wai et al. |
| 5,641,887 A | 6/1997 | Beckman et al. |
| 5,711,147 A | 1/1998 | Vogtlin et al. |
| 5,730,874 A | 3/1998 | Wai et al. |
| 5,756,657 A * | 5/1998 | Sawan et al. ............... 528/487 |
| 5,770,085 A | 6/1998 | Wai et al. |
| 5,809,774 A | 9/1998 | Peter-Hoblyn et al. |
| 5,809,775 A | 9/1998 | Tarabulski et al. |
| 5,832,721 A | 11/1998 | Cullen |
| 5,840,193 A | 11/1998 | Smart et al. |
| 5,845,492 A | 12/1998 | Isobe et al. |
| 5,928,128 A * | 7/1999 | Steketee et al. ............ 588/256 |
| 6,120,613 A * | 9/2000 | Romack et al. ............... 134/10 |
| 6,148,645 A * | 11/2000 | DeYoung et al. ........... 68/18 R |
| 6,177,033 B1 * | 1/2001 | Nauflett et al. .............. 264/3.1 |
| 6,240,725 B1 * | 6/2001 | Scappatura .................. 60/311 |

\* cited by examiner

METHOD AND A SYSTEM FOR REMOVING PARTICULATES AND TOXIC SUBSTANCES FROM AN EXHAUST OF AN ENGINE THAT USE HYDROCARBONS AS A FUEL

TECHNICAL FIELD

The present invention relates generally to a method and a system for treating the exhaust gas generated by internal combustion engines, and more particularly to a method and a system for removing particulates and other substances from the exhaust gases generated by internal combustion engines that use hydrocarbons as a fuel.

BACKGROUND ART

Various systems, processes, and techniques for treating exhaust gas generated by internal combustion engines to purify or rid the same of atmospheric pollutants are of course well known and may be categorized into several known types of treatment systems or processes.

One such treatment system or process is disclosed as using an aerosol having water particles coated with an oleophilic surfactant is admixed with the internal combustion engine exhaust gas. However, the exhaust gas needs to be initially cooled and is subsequently passed through an expansion turbine so as to cause condensation of water vapor upon the aerosol particles which may then be separated by a suitable separator, such as, a gas centrifuge. It can be appreciated that a system or process such as that disclosed has substantial and diverse equipment through which the internal combustion engine exhaust gas must pass in order to permit the exhaust gas to attain the various stages or states requisite to the treatment thereof.

Another similar or related type of process or system for treating combustion gas to remove pollutants has the products of combustion refrigerated so as to remove the pollutants as a liquid phase. More particularly, the pollutants removed have water formed during the combustion process, as well as pollutants which are substantially soluble in the condensed water. However, with respect to those pollutants which are water insoluble, such as, carbon monoxide, the same must be separately processed. After removal of the water and water soluble pollutants from the exhaust gas by the condensation process, the pollutants are conducted through suitable absorber, such as, a molecular sieve.

Another exhaust emission control system uses condensation techniques, however, such systems are quite complex and involve multiple cooling compression, and expansion stages.

Another type of technology which has been used to extract metals and/or metalloid contaminants from solid and liquid materials and is disclosed in U.S. Pat. No. 5,730,874 issued on Mar. 24, 1998 to Chien M. Wai et. al. The patent includes the extraction of such metals and/or metalloid contaminants from contaminated soils and waste streams, or from metal oxides. The technology discloses that the materials from which the contaminants are to be removed are exposed to a fluid solvent. Supercritical carbon dioxide containing a chelating is used as a preferably agent. The carbon dioxide is noted as having a triple point at approximately five atmospheres (5 atm) of pressure and a temperature of 216° K or –57° C., and the carbon dioxide is permitted to interact with the metals or metalloid contaminants whereupon the metal chelates are subsequently removed and the carbon dioxide is recycled for reuse.

It does not appear that the foregoing contaminant removal or extraction process has heretofore been applied to the removal of particulates and other substances from the exhaust gases generated by internal combustion engines that employ hydrocarbon fuels, and therefore, it is submitted that a need exists in the art for the application of a process or technology similar to such.

DISCLOSURE OF THE INVENTION

In one aspect of the invention a system for treating and cleaning the exhaust gas of an internal combustion engine from atmospheric pollutants is disclosed. The internal combustion engine uses hydrocarbons as fuel and the system has an emission exchanger, an apparatus which conducts exhaust gas from the internal combustion engine into the emission exchanger, and an apparatus which conducts carbon dioxide ($CO_2$) into the emission exchanger such that the carbon dioxide ($CO_2$) interacts with the internal combustion engine exhaust gas such that atmospheric pollutants are removed from the internal combustion engine exhaust gas by a stream of carbon dioxide ($CO_2$) gas. The cleaned exhaust gas is discharged into the atmosphere.

In another aspect of the invention a method for treating and cleaning exhaust gas of an internal combustion engine from atmospheric pollutants is disclosed. The internal combustion engine uses hydrocarbons as fuel. The method has the steps of: providing an emission exchanger; conducting exhaust gas from the internal combustion engine into the emission exchanger; conducting carbon dioxide ($CO_2$) into the emission exchanger such that the carbon dioxide ($CO_2$) interacts with the internal combustion engine exhaust gas such that atmospheric pollutants are removed from the internal combustion engine exhaust gas by a stream of carbon dioxide ($CO_2$) gas; and discharging the cleaned exhaust gas into an atmosphere.

BEST MODE FOR CARRYING OUT THE INVENTION

Figure 1:
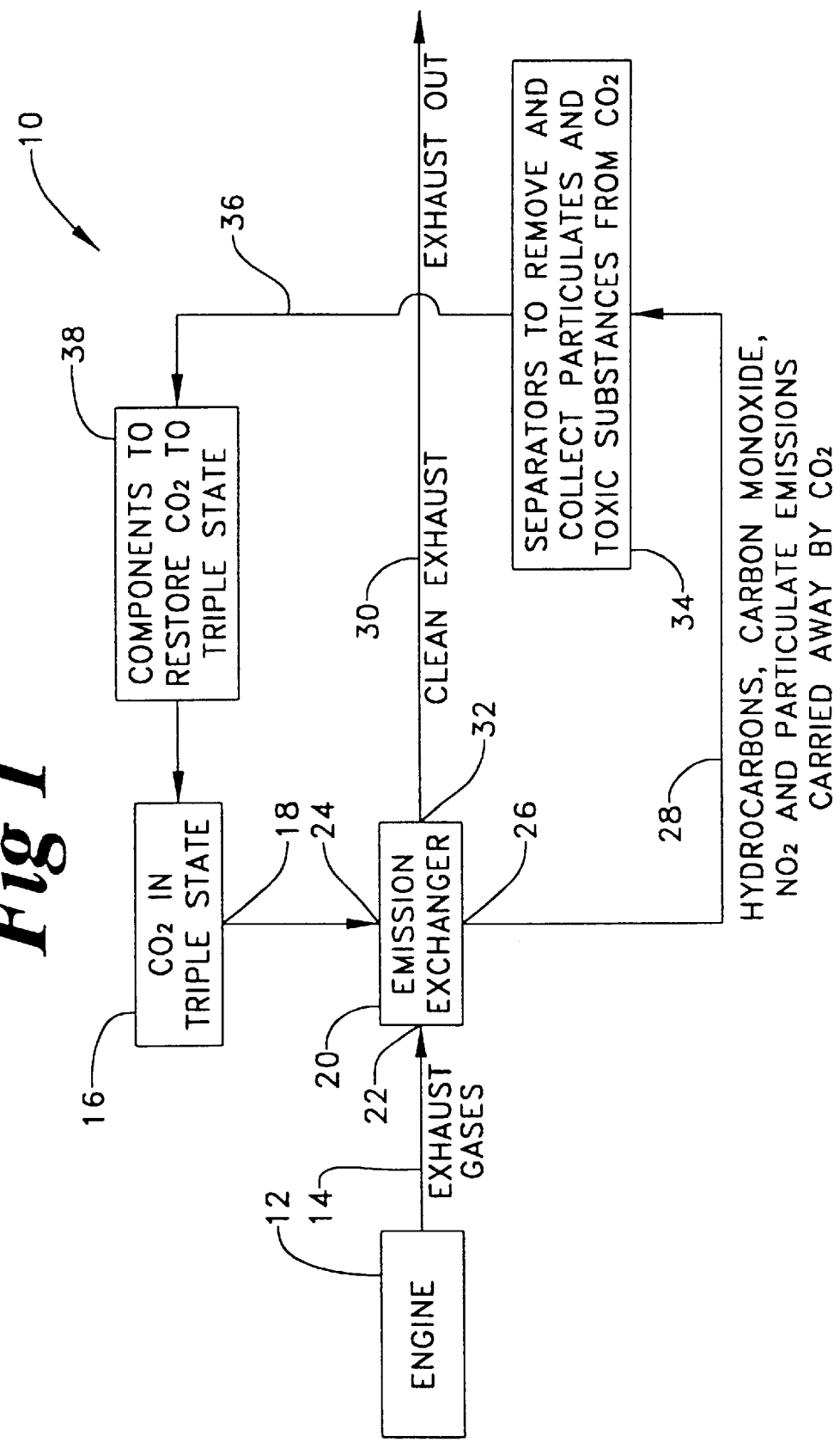
FIG. 1 is a flow diagram of an embodiment of a system for removing particulates and other substances from an exhaust gas of an internal combustion engine that uses hydrocarbons as fuel.

Referring to the drawings, and more particularly to FIG. 1, a method or system for removing particulates and other substances from an exhaust gas of an internal combustion engine that uses hydrocarbons as fuel is disclosed and indicated by the reference character 10. More particularly, an internal combustion engine 12, which uses hydrocarbons as fuel, emits or generates an exhaust gas 14 that contains various atmospheric pollutants, such as liquid and gaseous hydrocarbons, carbon monoxide, $No_x$, and particulate emissions. Obviously, it is desirable to scrub or remove such pollutants from the generated exhaust gas prior to the discharging of such into the atmosphere.

More particularly, carbon dioxide ($CO_2$), disposed in its triple state, a solid, a liquid, and a gaseous phase, is the preferred scrubbing agent. The carbon dioxide ($CO_2$) is stored in its triple state within a suitable container 16, at a pressure level of approximately five atmospheres (5 atm) and at a temperature level of about –57° C. (–70° F.). The storage container 16 is provided with an outlet port 18 through which the carbon dioxide ($CO_2$) is discharged when it is desired to utilize the same in treating the exhaust gas 14 from the engine 12. An emission exchanger 20 has a multi-port device through which the various constituents or components to be processed are passed.

More specifically, the emission exchanger 20 is seen to have a first inlet port 22 through which the exhaust gas 14 from the engine 12 is adapted to be received and conducted interiorly of the emission exchanger. A second inlet port 24 through which the carbon dioxide ($CO_2$), originally disposed in its triple state, is adapted to be received and conducted interiorly of the emission exchanger 20.

As a result of the fact that the interior of the emission exchanger 20 is not disposed at temperature and pressure conditions similar to the triple state conditions of the carbon dioxide ($CO_2$) characteristic of the container 16, the carbon dioxide ($CO_2$) present within or flowing through the emission exchanger 20 is disposed in its gaseous state. Consequently, as a result of the interaction of the gaseous carbon dioxide ($CO_2$) with the engine exhaust gas 14 within the emission exchanger 20, the carbon dioxide ($CO_2$) scrubs or removes gaseous and liquid hydrocarbons, carbon monoxide, $No_x$, and particulate emissions from the exhaust gas 14. Such scrubbed, removed, or separated gaseous or liquid hydrocarbons, carbon monoxide, $No_x$, and particulate emissions are discharged from the emission exchanger 20 through a first outlet port 26 so as to be effectively carried away by the carbon dioxide ($CO_2$) gas as at 28. Concomitantly, cleaned exhaust gas 30 is discharged to the atmosphere through a second outlet port 32 provided within the emission exchanger 20.

With continued reference being made to FIG. 1, it is further desired to recycle the pollutant scrubbing carbon dioxide ($CO_2$) such that the same can be continuously reused within the system 10. Accordingly, it is firstly essential to separate the aforenoted particulates and other substances from the carbon dioxide ($CO_2$) gas, and this stage of the process may be readily accomplished by passing the pollutant-laden carbon dioxide ($CO_2$) gaseous stream through various mechanical or other types of separators, which are generally designated at 34. The particulates and other substances are therefore separated, collected, and removed from the carbon dioxide ($CO_2$) gaseous stream, and the cleaned or refurbished gaseous carbon dioxide ($CO_2$) is then discharged from the separators, as at 36, and conducted back toward the storage vessel or container 16.

In order to restore the gaseous carbon dioxide ($CO_2$) to its triple state for storage within the vessel or container 16, the cleaned or refurbished gaseous carbon dioxide ($CO_2$) stream is conducted through various components or stages. The components or stages are generally indicated by the reference character 38. The gaseous carbon dioxide ($CO_2$) is subjected to pressure and temperature conditions which restores the gaseous carbon dioxide ($CO_2$) to its triple state for storage within the container or vessel 16. The carbon dioxide ($CO_2$), now disposed in its triple state, is then able to be conveyed or conducted into the storage vessel or container 16 for storage in preparation for use within another exhaust gas treatment cycle.

Figure 2:
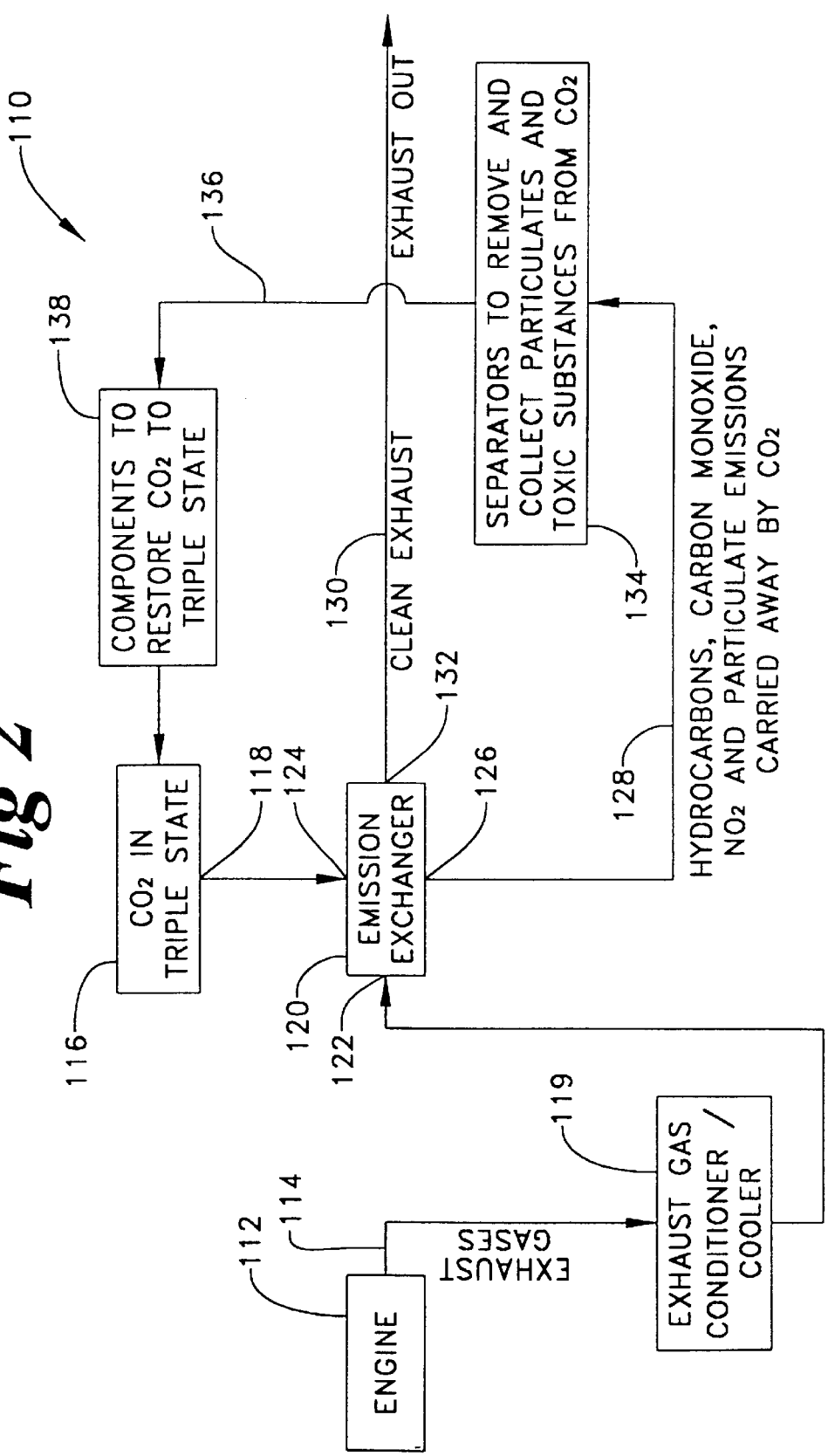
FIG. 2 is a flow diagram, similar to that of FIG. 1, showing another embodiment of the system for removing particulates and other substances from the exhaust gas of the internal combustion engine that uses hydrocarbons as fuel.

With reference to FIG. 2, another embodiment of a method or a system for removing particulates and other substances from exhaust gas of an internal combustion engine that uses hydrocarbons as fuel is disclosed and is generally indicated by the reference number 110. The method or system 110 is very similar to the system 10 disclosed in FIG. 1. And consequently, all parts of the system 110, which are similar to or the same as those corresponding parts of the method or system 10 of FIG. 1, have been designated by reference characters that are the same as those in FIG. 1 except that the reference characters of the system of FIG. 2 are in the 100 series.

As can be readily appreciated, the only significant difference between the method or system 10 of FIG. 1 and the method or system 110 of FIG. 2 is that an exhaust gas cooler/conditioner 119 has been interposed the engine 112 and the emission exchanger 120. The purpose of the exhaust gas cooler/conditioner 119 is to cool or condition the engine exhaust gas 114 such that the exhaust gas 114 has temperature and pressure parameters which are somewhat more compatible with the temperature and pressure parameters of the carbon dioxide ($CO_2$), disposed in its triple state, being transmitted to or conducted into the emission exchanger 120. Once the cooled/conditioned exhaust gas 114 and the carbon dioxide ($CO_2$) are conducted into the emission exchanger 120, the system 110 functions substantially the same as the system 10 disclosed in FIG. 1.

Thus, it may be seen that in accordance with the teachings and principles of the present invention, a method or system has been developed whereby internal combustion engine exhaust gas, which contain particulates, hydrocarbon, carbon monoxide, and $No_x$ pollutants, are able to be simply and readily treated in accordance with scrubbing or cleaning techniques which utilize carbon dioxide ($CO_2$) and is able to be readily recycled for reuse within subsequent treatment cycles.

Thus, such technology and/or processes are applicable to the exhaust gas generated by internal combustion engines that employ hydrocarbon fuels. Particulates and other substances can be effectively removed from such engine exhaust gas in a relatively simple and straight forward manner without requiring extensive equipment and multi-stage apparatus as is characteristic of conventional exhaust gas treatment apparatus or systems.

Other aspects, objects and advantages of thins invention can be obtained from a study of the drawings, disclosure and the appended claims.

What is claimed is:

1. A system for treating and cleaning an exhaust gas of an internal combustion engine from atmospheric pollutants, said internal combustion engine using hydrocarbons as fuel, said system comprising:
   an emission exchanger;
   an apparatus which conducts exhaust gas from said internal combustion engine into said emission exchanger; and
   an apparatus which conducts carbon dioxide ($CO_2$) into said emission exchanger such that said carbon dioxide ($CO_2$) interacts with said internal combustion engine exhaust gas such that a hydrocarbon is removed from said internal combustion engine exhaust gas by a stream of carbon dioxide ($CO_2$) gas, said cleaned exhaust gas being discharged into the atmosphere.

2. The system of claim 1 wherein said carbon dioxide ($CO_2$) interacts with said internal combustion engine exhaust gas such that at least one of carbon monoxide, $NO_x$, and particulate matter is removed from said internal combustion engine exhaust gas by said stream of carbon dioxide ($CO_2$) gas.

3. The system as set forth in claim 1, including an apparatus which stores said carbon dioxide ($CO_2$) in a storage container at its triple state, said triple state being a solid, liquid, and gaseous phases, prior to conducting said carbon dioxide ($CO_2$) into said emission exchanger.

4. The system as set forth in claim 3, wherein said carbon dioxide ($CO_2$) is disposed within said storage container at a pressure level of about five atmospheres (5 atm) and a temperature level of about −57° C.

5. The system as set forth in claim 3, including an exhaust gas cooler/conditioner for treating said engine exhaust gas prior to conveyance of said engine exhaust gas into said emission exchanger so as to render the temperature and pressure parameters of said engine exhaust gas compatible with the temperature and pressure parameters of said carbon dioxide ($CO_2$) as both said engine exhaust gas and said carbon dioxide ($CO_2$) are conducted into said emission exchanger.

6. The system as set forth in claim 3, including an apparatus which separates said hydrocarbon from said stream of carbon dioxide ($CO_2$) gas so as to permit said stream of carbon dioxide ($CO_2$) gas to be recycled for reuse within said system.

7. The system as set forth in claim 6, including an apparatus which restores said stream of carbon dioxide gas ($CO_2$) to said triple state so as to be able to be stored in said triple state prior to conveyance into said emission exchanger.

8. A method for treating and cleaning an exhaust gas of an internal combustion engine from atmospheric pollutants, said internal combustion engine using hydrocarbons as fuel, said system comprising:
   providing an emission exchanger;
   conducting exhaust gas from said internal combustion engine into said emission exchanger;
   conducting carbon dioxide ($CO_2$) into said emission exchanger such that said carbon dioxide ($CO_2$) interacts with said internal combustion engine exhaust gas such that a hydrocarbon is removed from said internal combustion engine exhaust gas by a stream of carbon dioxide ($CO_2$) gas; and
   discharging said cleaned exhaust gas into an atmosphere.

9. The method of claim 8 wherein said step of conducting carbon dioxide ($CO_2$) into said emission exchanger includes interacting said carbon dioxide ($CO_2$) with said internal combustion engine exhaust gas such that at least one of carbon monoxide, $NO_x$, and particulate matter is removed from said internal combustion engine exhaust gas by said stream of carbon dioxide ($CO_2$) gas.

10. The method as set forth in claim 8, including the step of storing said carbon dioxide ($CO_2$) in a storage container at its triple state, said triple state being a solid, liquid, and gaseous phases, prior to conducting said carbon dioxide ($CO_2$) into said emission exchanger.

11. The method as set forth in claim 10, including the step of storing said carbon dioxide ($CO_2$) within said storage container at a pressure level of about five atmospheres (5 atm) and a temperature level of about −57° C.

12. The method as set forth in claim 10, including the step of conducting said internal combustion engine exhaust gas through an exhaust gas cooler/conditioner for treating said internal combustion engine exhaust gas prior to conducting said internal combustion engine exhaust gas into said emission exchanger so as to render the temperature and pressure parameters of said internal combustion engine exhaust gas compatible with the temperature and pressure parameters of said carbon dioxide ($CO_2$) as both said internal combustion engine exhaust gas and said carbon dioxide ($CO_2$) are conducted into said emission exchanger.

13. The method as set forth in claim 10, including the step of separating said hydrocarbon from said stream of carbon dioxide ($CO_2$) gas so as to permit said stream of carbon dioxide ($CO_2$) gas to be recycled for reuse within said method.

14. The method as set forth in claim 13, including the step of restoring said stream of carbon dioxide ($CO_2$) gas to said triple state so as to be able to be stored in said triple state prior to conveyance into said emission exchanger.

15. A system for treating and cleaning an exhaust gas of an internal combustion engine from atmospheric pollutants, said internal combustion engine using hydrocarbons as fuel, said system comprising:
   an emission exchanger;
   an apparatus which conducts exhaust gas from said internal combustion engine into said emission exchanger;
   an apparatus which conducts carbon dioxide ($CO_2$) into said emission exchanger such that said carbon dioxide ($CO_2$) interacts with said internal combustion engine exhaust gas such that a hydrocarbon is removed from said internal combustion engine exhaust gas by a stream of carbon dioxide ($CO_2$) gas, said cleaned exhaust gas being discharged into the atmosphere; and
   an exhaust gas cooler/conditioner for treating said engine exhaust gas prior to conveyance of said engine exhaust gas into said emission exchanger so as to render the temperature and pressure parameters of said engine exhaust gas compatible with the temperature and pressure parameters of said carbon dioxide ($CO_2$) as both said engine exhaust gas and said carbon dioxide ($CO_2$) are conducted into said emission exchanger.

16. The system of claim 15 wherein said carbon dioxide ($CO_2$) interacts with said internal combustion engine exhaust gas such that at least one of carbon monoxide, $NO_x$, and particulate matter is removed from said internal combustion engine exhaust gas by said stream of carbon dioxide ($CO_2$) gas.

* * * * *

UNITED STATES PATENT AND TRADEMARK OFFICE
CERTIFICATE OF CORRECTION

PATENT NO. : 6,625,977 B2
DATED : September 30, 2003
INVENTOR(S) : David L. Lehman It is certified that error appears in the above-identified patent and that said Letters Patent is hereby corrected as shown below:

Title page, Item [54] and Column 1, lines 1-4,
Title, change from "A METHOD AND A SYSTEM FOR REMOVING PARTICULATES AND TOXIC SUBSTANCES FROM AN EXHAUST OF AN ENGINE THAT USE HYDROCARBONS AS A FUEL" to
-- A METHOD AND A SYSTEM FOR REMOVING PARTICULATES AND OTHER SUBSTANCES FROM AN EXHAUST OF AN ENGINE THAT USES HYDROCARBONS AS A FUEL --

Column 5,
Line 27, "A method for treating and cleaning exhaust gas of an internal combustion engine from atmospheric pollutants, said internal combustion engine using hydrocarbons as fuel, said system comprising the steps of:
  providing an emission exchanger;
  conduction exhaust gas from said internal combustion engine into said emission exchanger;
  conducting carbon dioxide ($CO_2$) into said emission exchanger such that said carbon dioxide ($CO_2$) interacts with said internal combustion engine exhaust gas such that a hydrocarbon is removed from said internal combustion engine exhaust gas by a stream of carbon dioxide ($CO_2$) gas; and
  discharging said cleaned exhaust gas into an atmosphere."

Please change to read as follows:

-- A method for treating and cleaning exhaust gas of an internal combustion engine from atmospheric pollutants, said internal combustion engine using hydrocarbons as fuel, said method comprising the steps of:
  providing an emission exchanger;
  conduction exhaust gas from said internal combustion engine into said emission exchanger;

UNITED STATES PATENT AND TRADEMARK OFFICE
CERTIFICATE OF CORRECTION

PATENT NO.    : 6,625,977 B2
DATED         : September 30, 2003
INVENTOR(S)   : David L. Lehman It is certified that error appears in the above-identified patent and that said Letters Patent is hereby corrected as shown below:

Column 5 (cont'd),
      conducting carbon dioxide ($CO_2$) into said emission exchanger such that said carbon dioxide ($CO_2$) interacts with said internal combustion engine exhaust gas such that a hydrocarbon is removed from said internal combustion engine exhaust gas by a stream of carbon dioxide ($CO_2$) gas; and
      discharging said cleaned exhaust gas into an atmosphere. --

Signed and Sealed this

Second Day of March, 2004

JON W. DUDAS
*Acting Director of the United States Patent and Trademark Office*